United States Patent
Jasmin

(10) Patent No.: US 11,103,112 B1
(45) Date of Patent: Aug. 31, 2021

(54) TOILET TRAINING DEVICE

(71) Applicant: Mark Jasmin, Cote St. Luc (CA)

(72) Inventor: Mark Jasmin, Cote St. Luc (CA)

( * ) Notice: Subject to any disclaimer, the term of this patent is extended or adjusted under 35 U.S.C. 154(b) by 0 days.

(21) Appl. No.: 16/152,869

(22) Filed: Oct. 5, 2018

Related U.S. Application Data

(60) Provisional application No. 62/568,364, filed on Oct. 5, 2017.

(51) Int. Cl.
*A47K 11/02* (2006.01)
*A47K 11/12* (2006.01)

(52) U.S. Cl.
CPC .............. *A47K 11/02* (2013.01); *A47K 11/12* (2013.01)

(58) Field of Classification Search
CPC ........ A47K 11/04; A47K 11/06; A47K 11/12; A47K 11/02; A47B 88/402
See application file for complete search history.

(56) References Cited

U.S. PATENT DOCUMENTS

| | | | | | |
|---|---|---|---|---|---|
| 2,719,305 | A | * | 10/1955 | La Hue | A47K 11/04 4/483 |
| 2,980,919 | A | | 4/1961 | Otto et al. | |
| 3,653,077 | A | * | 4/1972 | Warnberg | A47K 13/12 4/236 |
| 3,825,310 | A | * | 7/1974 | Roemer | F16C 29/02 384/23 |
| 5,535,456 | A | * | 7/1996 | Chai | A47K 11/06 4/449 |
| 5,822,804 | A | * | 10/1998 | Hauflaire | A47K 11/12 4/144.1 |
| 6,000,943 | A | | 12/1999 | Dawson | |
| 7,712,159 | B2 | * | 5/2010 | Stringer | A47K 11/06 4/239 |
| 7,891,030 | B1 | * | 2/2011 | Sutton | A47K 11/06 4/483 |
| 9,027,173 | B2 | * | 5/2015 | Dunn | E03D 9/007 206/210 |
| 2002/0020006 | A1 | | 2/2002 | Mason et al. | |
| 2008/0184470 | A1 | | 2/2008 | Veroni | |
| 2010/0005582 | A1 | | 1/2010 | Rao | |
| 2014/0143944 | A1 | | 9/2014 | Jose | |
| 2015/0201816 | A1 | * | 7/2015 | Hebert | E03D 9/00 4/300.3 |

* cited by examiner

*Primary Examiner* — Janie M Loeppke

(74) *Attorney, Agent, or Firm* — Cramer Patent & Design PLLC; Aaron R. Cramer

(57) ABSTRACT

A toilet training device utilizes a bowl-shaped base with a removable receptacle and an upright urinal back. The urinal back is in fluid communication with the receptacle. An aperture in the top exterior edge of the urinal enables fluid communication with a plurality of apertures disposed along an upper interior inside edge of the urinal. A pair of cup holders are disposed opposite the aperture in the top of the urinal.

8 Claims, 4 Drawing Sheets

TOILET TRAINING DEVICE

RELATED APPLICATIONS

The present invention is a continuation-in-part of and claims the benefit of U.S. Provisional Application No. 62/568,364 filed on Oct. 5, 2017, the entire disclosures of which are incorporated herein by reference.

FIELD OF THE INVENTION

The present invention relates generally to the field of toilet training devices.

BACKGROUND OF THE INVENTION

A potty chair is a proportionately small chair or enclosure with an opening for seating very young children to "go potty", such that the seat is designed for the size of the child to provide additional comfort and safety over a traditional toilet. A potty chair is a variant of the close stool which was used by adults before the widespread adoption of water flushed toilets.

There are a variety of designs, some placed directly over the toilet called "Toilet Training Seats" so the egested fecal material drops directly into the toilet bowl thereby eliminating manual removal and disposal of the waste from a receptacle beneath the hole which is often a bag or receptacle similar to a chamber pot, if the child stays in the correct position, of course. Other types of potty chairs may be stand-alone in that they do not sit upon a toilet, but contain a basin or bin into which the child may defecate or urinate. Potty chairs are used during potty training, a.k.a. toilet training.

One (1) limitation with the traditional potty chair is that the device requires a male child user to sit during urination. In some cases, this may be unconformable to the child or the child may miss the potty chair. A suitable solution is desired.

Various attempts have been made to solve problems found in potty chair art. Among these are found in: U.S. Pat. Nos. 5,004,020; 5,978,976; 6,038,711; and U.S. Pat. App. Pub. No. 2014/0143944. These prior art references are representative of children's training potties.

None of the above inventions and patents, taken either singly or in combination, is seen to describe the invention as claimed. Thus, a need exists for a reliable potty chair with a urinal attachment, and to avoid the above-mentioned problems.

SUMMARY OF THE INVENTION

The inventor has recognized the aforementioned, inherent problems and lack in the art and observed that there is a need for a toilet training device, comprising a base having a removable waste reservoir. The removable waste reservoir has a urinal attachment. The urinal attachment is attached to an upper rear of the base by a means for attachment. The base also has a flared-out bottom to provide support for the toilet training device. There is an area which is defined before a rear portion of an exterior sidewall of the base having a base top opening. This opening is sized to enable removable fitting of the removable waste reservoir. The removable waste reservoir includes a basin interior having a bottom wall, a plurality of sidewalls, and a handle to facilitate the insertion and retraction of the removable waste reservoir from the base.

The device also comprises a seat removably affixed to the top of the base immediately below the seat cover. The seat is a flared out in a planar portion of an entire upper perimeter of the exterior sidewall of the base except for a front central region, thereby resembling a conventional toilet bowl seat. The basin is sized to enable receipt and retention of multiple bowel movements or urine directed into the basin. The seat cover is hingedly attached to a rear upper edge of the base which is adjacent to the seat when the removable waste reservoir is in place. The front inner sidewall of the seat, which is subjacent from the upper edge, has a urine guard hingedly attached to a central location. The seat cover has a seat cover aperture which is sized to permit routing of the urinal back extension to be inserted through the cover aperture, the urinal attachment includes a urinal frame and a urinal back. The device also comprises a pair of handle extensions which are disposed on opposing sides of the seat portion, the handle extensions are horizontally aligned and represent an extension of the seat.

The means for attachment may be selected from the group consisting of a tab and a slot attachment, a post and an aperture attachment, or an attachment with any interlocking features. The device may also comprise a pair of hinges on either side of the seat cover aperture. The urine guard may extend upwards from an inner side of the seat—when the seat cover is in a down configuration, the inner surface of the seat cover forces the urine guard to hinge downward. The force of the hinge of the urine guard is not able to overcome a weight of the seat cover and open it.

The seat cover is configured to support a weight of a child standing thereon when using the toilet training device as a urinal. The hinges either bias the seat cover away from or towards the seat. The removable waste reservoir may be removable from the base without detaching either the urinal attachment or the seat cover. A bottom portion of the urinal frame may be removably attached to a location on the rear of the base. The urinal frame may attach to the exterior sidewall of the base.

A lower portion of the urinal back may either taper or has features to direct a flow of urine or water towards the urinal back extension.

A basin insert is generally removable from the base via a means for sliding. An upper surface on the base is provided with a male guide slide and is generally centrally located. A bottom surface of the removable waste reservoir may be provided with a female guide slide and located such that the male guide slide and the female guide slide align with each other to provide a necessary mechanical coupling to the removable waste reservoir to the base. The male guide slide and the female guide slide, or other similar means for attachment, may result in a fixed and immovable proper alignment of the removable waste reservoir to the base.

The rear of the base may have a gap which is centrally located enabling a urinal back extension of the urinal attachment to extend therein to provide fluid communication with the insert interior when the removable waste reservoir is in place. The toilet training device may be cleaned by pouring a liquid through the aperture shaped opening at the top of the urinal frame to rinse the urinal back. The toilet training device potty is suitable for children as young as a one-year-old.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
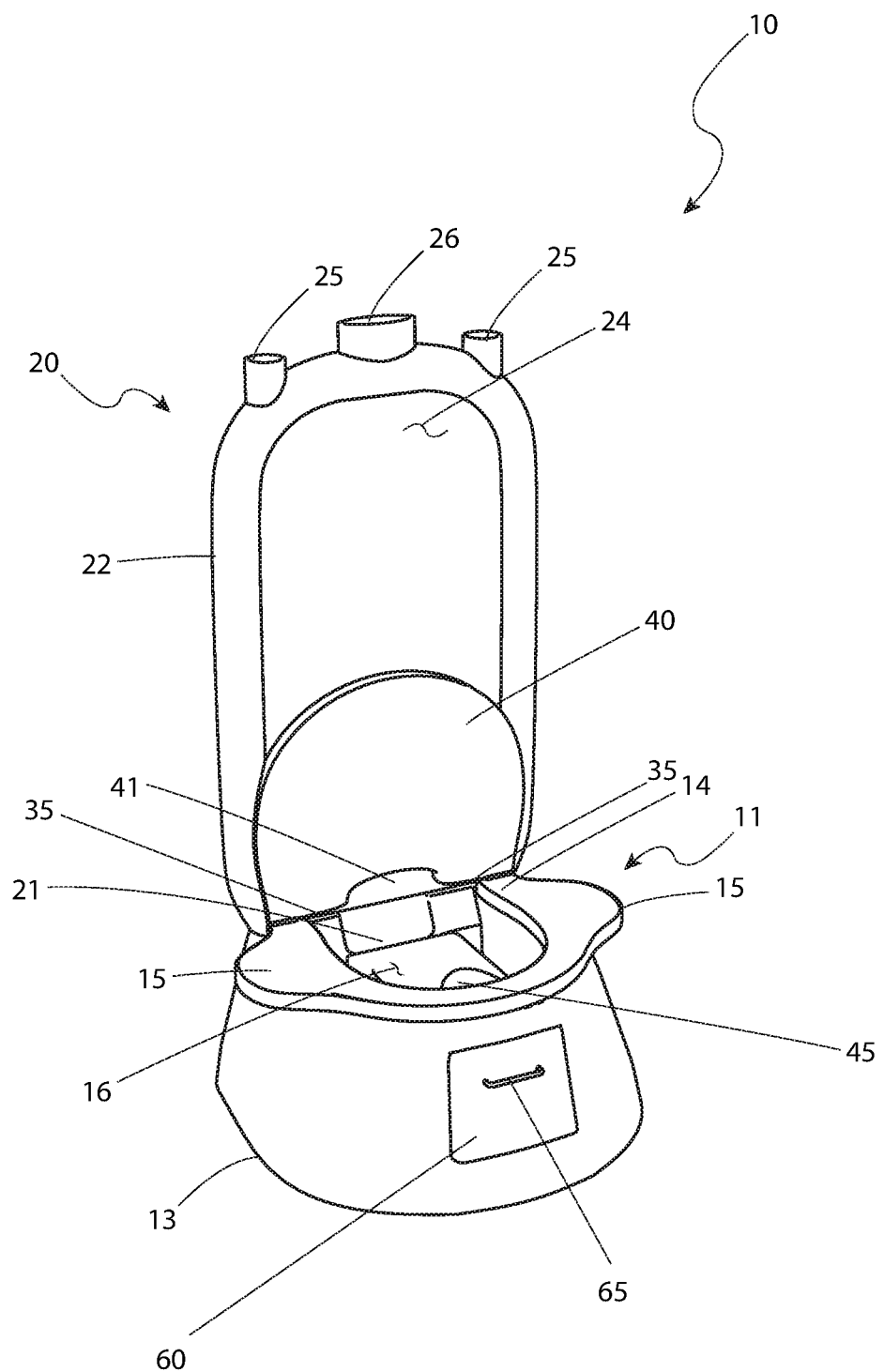
FIG. 1 is a front perspective view of a toilet training device, with the seat cover in a raised position, according to an embodiment of the present invention.

DESCRIPTIVE KEY 10 toilet training device
13 base
14 seat
15 handle extension
16 basin interior
17 base top opening
20 urinal attachment
21 urinal back extension
22 urinal frame
24 urinal back
25 cup holder
26 aperture
35 spring hinge
40 seat cover
41 seat cover aperture
45 urine guard
60 removable waste reservoir
65 handle
70 male guide slide
75 female guide slide

1. DESCRIPTION OF THE INVENTION

The present invention is directed to a toilet training device 10. In one (1) embodiment of the present invention, the toilet training device 10 may comprise a base 13 with a removable waste reservoir 60 further having a urinal attachment.

Referring now to the drawings, there is shown in FIG. 1 a toilet training device 10 with a urinal attachment 20 attached to the base 13 with the seat cover 40 in an open configuration. The urinal attachment 20 can be attached the upper rear of the base 13 in any desired means for attachment, including a tab and a slot attachment, a post and an aperture attachment, an attachment with any interlocking features, or the urinal attachment 20 and base 13 can be a unitary construction.

The toilet training device 10 may provide potty training at a new level. The toilet training device 10 is a two in one (2-in-1) product possible for potty training children as young as a one (1) year-old, all the way up until your child is able to be a "big kid". The toilet training device 10 may be a simple-to-use product that incorporates a standing urinal attachment 20 into a traditional sitting toilet, including a base 13 and a removable waste reservoir 60, particularly suited for boys that do not need to sit while urinating. The toilet training device 10 may even be used for little girls, by not using the standing urinal attachment 20. Such a convenience allows a single system if parents are awaiting or expecting additional children in the future. In this way, as well as gender neutral color scheme designs, all children can keep and grow with this product without having to purchase new training chairs for each child.

The toilet training device 10 includes a base 13 having a flared-out bottom to provide support for the entire device 10. The base 13 has an exterior sidewall with the side portions of the sidewall and the front portion of the sidewall being coextensive in height, where the rear portion of the sidewall extends upward. The opposing edges of the rear portion of the sidewall are attached to the urinal attachment 20, or in the case of the urinal attachment 20 and the base 13 being a unitary construction, the point where the urinal frame 22 and urinal back 24 extends upward therefrom. The area defined before of the rear portion of the sidewall of the base 13 is the base top opening 17, sized to enable removable fitting of the removable waste reservoir 60 therein. The interior of the base 13 is hollow in one (1) embodiment, recessed in another embodiment, or solid in yet another embodiment. All embodiments are sized to enable the insertion of the removable waste reservoir 60 therein.

The removable waste reservoir 60 comprises a basin interior 16, having a bottom wall, sidewalls, and a handle 65 to facilitate the insertion and retraction of said removable waste reservoir 60 from the base 13. A seat 14 is removably affixed to the top of the base 13 immediately below the seat cover 40. The seat 14 is a flared out planar portion of the entire upper perimeter of the sidewall of the base 13 except for the front central region, thereby resembling a conventional toilet bowl seat. Also, the seat 14 could be continuous. The basin 16 is sized to enable receipt and retention of multiple bowel movements or urine directed therein. Disposed on opposing sides of the seat 14 portion are a pair of handle extensions 15. The handle extensions 15 are preferably horizontally aligned and represent an extension of the seat 14.

Figure 3:
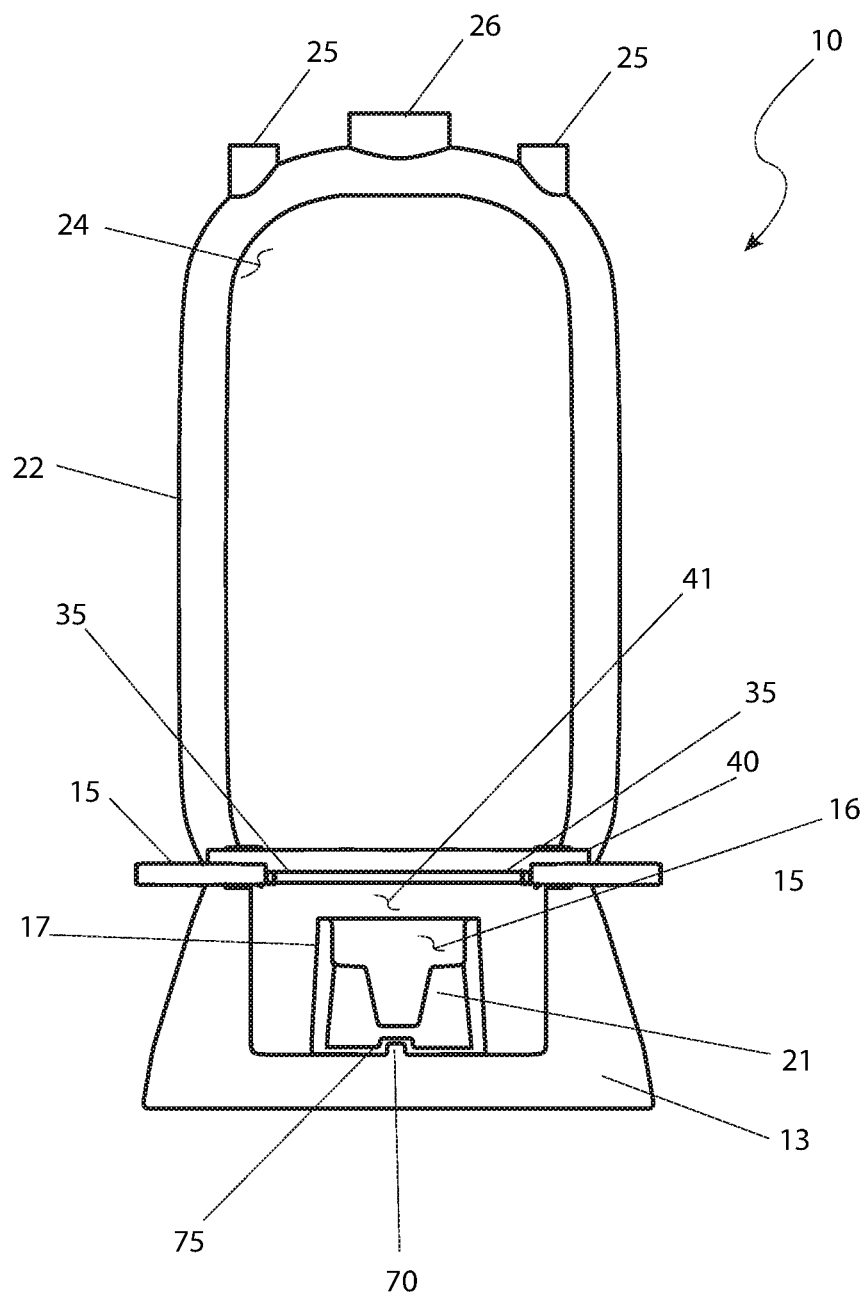
FIG. 3 is a cut away view taken along the Line 1-1 of the device with the seat cover in a closed position, according to an embodiment of the present invention.

FIG. 3 illustrates how the basin insert 11 is generally removable from the base 13 via a means for sliding. An upper surface on the base 13 is provided with a male guide slide 70 and is generally centrally located. The bottom surface of the removable waste reservoir 60 is provided with a female guide slide 75 and located such that the male guide slide 70 and the female guide slide 75 align with each other to provide the necessary mechanical coupling to the removable waste reservoir 60 to the base 13. In this embodiment, the handle 65 aids in the grasping and removal of the removable waste reservoir 60 basin insert 11 from the base 13.

It is appreciated that other similar attachment means can be used to attach the removable waste reservoir 60 to the base 13. It is also appreciated that the male guide slide 70 and the female guide slide 75, or other similar attachment means, result in a relatively fixed and immovable proper alignment of the removable waste reservoir 60 to the base 13.

The rear of the base 13 has a gap centrally located enabling a urinal back extension 21 of the urinal attachment 20 to extend therein to provide fluid communication with the insert interior 16 when the removable waste reservoir 60 is in place. A seat cover 40 is hingedly attached to the rear upper edge of the base 13, adjacent to the seat 14 when the removable waste reservoir 60 is in place. The seat cover 40 has a seat cover aperture 41 sized to permit the routing of the urinal back extension 21 to be inserted through. As such, a pair of hinges 35 on either side of the seat cover aperture 41 will be a preferred feature. These hinges 35 can either bias the seat cover 40 away from or towards to the seat 14. The removable waste reservoir 60 is removable from the base 13 without detaching either the urinal attachment 20 or the seat cover 40.

The front inner sidewall of the seat 14, subjacent from the upper edge, has a urine guard 45 hingedly attached to a central location. The urine guard 45 is hingedly biased to be in the deployed, upper configuration. The urine guard 45 would extend upward from an inner side of the seat 14. When the seat cover 40 is in the down configuration, the inner surface of the seat cover 40 forces the urine guard 45 to hinge downward. The force of the hinge of the urine guard 45 is not able to overcome the weight of seat cover 45 and open it. The seat cover 40 is capable of supporting a weight of a child standing thereon when using the device 10 as a urinal.

The urinal attachment 20 includes a urinal frame 22 and a urinal back 24. The bottom portion of the urinal frame 20 removably attaches to a location on the rear of the base 13. Other embodiments provide for the urinal frame 22 to attach to the sidewall of the base 13. In a preferred embodiment, the urinal frame 22 is generally "U"-shaped, with the terminal points being the attachment to the base 13. The urinal back 24 is fully attached along three (3) sides to the urinal frame 22 and set rearwardly in relation to the front edge of the urinal frame 22. The lower portion of the urinal back 24 either tapers or has features to direct a flow of urine or water towards the urinal back extension 21.

The upper part of the urinal frame 22 has at least one (1) cup holder 25 located at the bridge portion thereof. Each cup holder 25 can either have an open bottom or a bottom wall. Centrally located on the upper part of the urinal frame 22 is an aperture 26, providing fluid communication with the urinal back 24.

Figure 2:
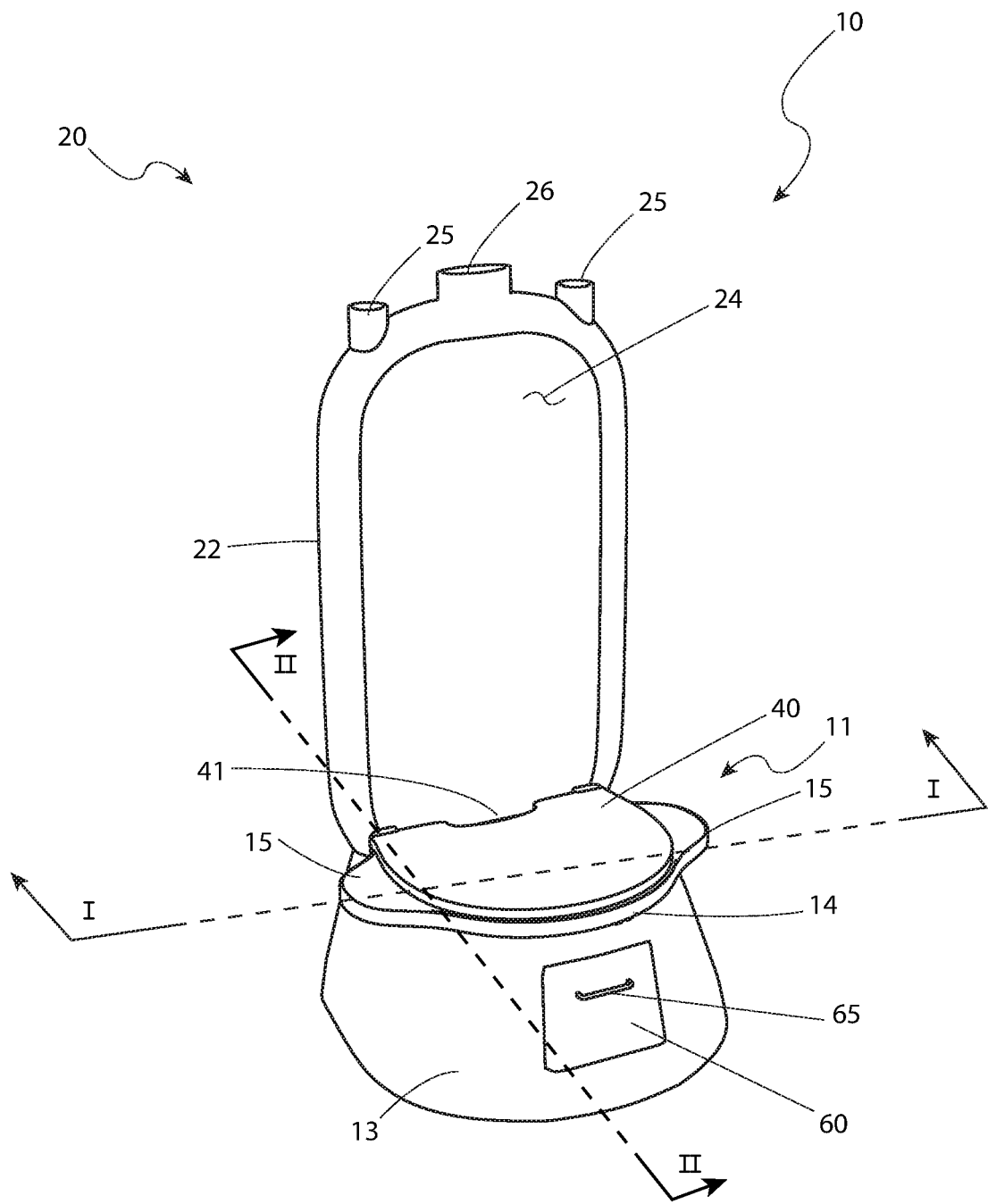
FIG. 2 is a front perspective view of the device, with the seat cover in a closed position, according to an embodiment of the present invention.
Figure 4:
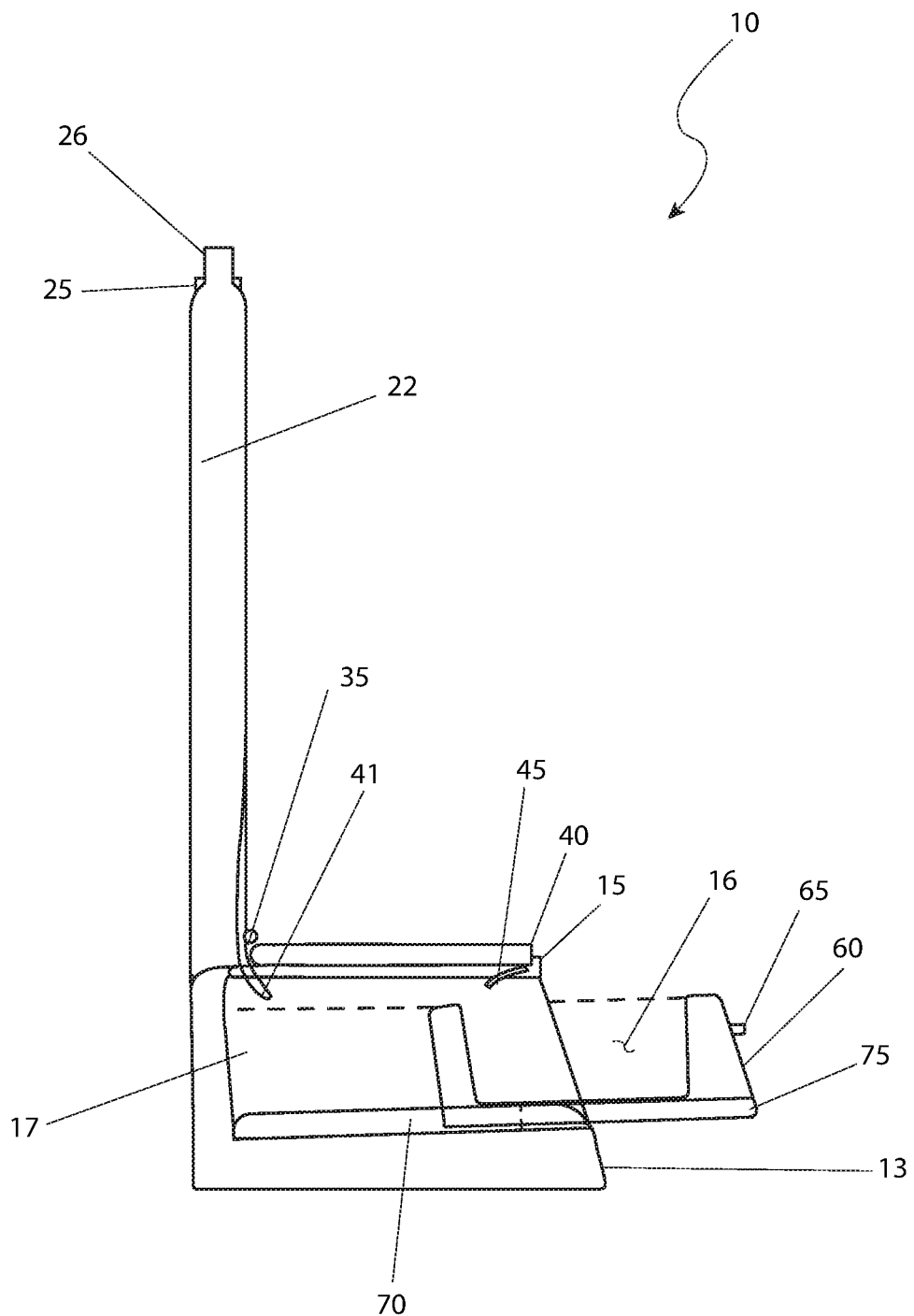
FIG. 4 is a cut away view taken along the Line II-II of the device with the removable waste reservoir shown in a partially withdrawn position, according to an embodiment of the present invention.

FIG. 4 depicts a cut away view taken along the line II-II (see FIG. 2) of the device 10 with the removable waste reservoir 60 shown in a partially withdrawn position, according to an embodiment of the present invention. This view depicts the axial alignment properties of the male guide slide 70 and the female guide slide 75 and their guiding action as performed upon the base 13 and removable waste reservoir 60 respectively.

The toilet training device 10 may be easily cleaned by pouring water through the aperture 26 shaped opening at the top of the urinal frame 22, to rinse clean the urinal back 24. The water poured is then directed into the insert interior 16 of the removable waste reservoir 60 via the urinal back extension 21. The ease of cleaning helps to prevent the spreading of germs. The height of the device 10 should be just over three feet (3 ft.) tall and one-and-a-half (1½ ft.) wide to maintain stability while placed on the floor and while the child is seated.

The exact specifications, materials used, and method of use of the device 10 may vary upon manufacturing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A toilet training device, comprising:
   a base having a removable waste reservoir, said removable waste reservoir having a urinal attachment, said urinal attachment is attached to an upper rear of said base by a means for attachment, said base having a flared-out bottom to provide support for said toilet training device;
   an area defined before of a rear portion of an exterior sidewall of said base is a base top opening sized to enable removable fitting of said removable waste reservoir therein, said removable waste reservoir includes a basin interior having a bottom wall, a plurality of sidewalls, and a handle to facilitate said insertion and retraction of said removable waste reservoir from said base;
   a seat removably affixed to said top of said base immediately below a seat cover, said seat is a flared out planar portion of an entire upper perimeter of said exterior sidewall of said base except for a front central region, thereby resembling a conventional toilet bowl seat, said basin is sized to enable receipt and retention of multiple bowel movements or urine directed therein, said seat cover is hingedly attached to a rear upper edge of said base, adjacent to said seat when said removable waste reservoir is in place, said front inner sidewall of said seat, subjacent from said upper edge, has a urine guard hingedly attached to a central location, said seat cover has a seat cover aperture sized to permit routing of a urinal back extension to be inserted through, said urinal attachment includes a urinal frame and a urinal back;
   a pair of handle extensions disposed on opposing sides of said seat portion, said handle extensions are horizontally aligned and represent an extension of said seat;
   a pair of hinges on either side of said seat cover aperture; and
   at least one cup holder located at a bridge portion of an upper part of said urinal frame extended above said seat cover;
   wherein said means for attachment is selected from the group consisting of a tab and a slot attachment or a post and an aperture attachment;
   wherein said pair of hinges either bias said seat cover away from or towards said seat;
   wherein an upper surface on said base is provided with a male guide slide and is generally centrally located;
   wherein a bottom surface of said removable waste reservoir is provided with a female guide slide and located such that said male guide slide and said female guide slide align with each other to provide a necessary mechanical coupling to said removable waste reservoir to said base; and
   wherein said male guide slide and said female guide slide result in a fixed and immovable proper alignment of said removable waste reservoir to said base.

2. The toilet training device according to claim 1, wherein said urine guard extends upwards from an inner side of said seat and when said seat cover is in a down configuration, said inner surface of said seat cover forces said urine guard to hinge downward.

3. The toilet training device according to claim 1, wherein said removable waste reservoir is removable from said base without detaching either said urinal attachment or said seat cover.

4. The toilet training device according to claim 1, wherein a bottom portion of said urinal frame removably attaches to a location on said rear of said base.

5. The toilet training device according to claim 1, wherein said urinal frame attaches to said exterior sidewall of said base.

6. The toilet training device according to claim 1, wherein a lower portion of said urinal back either tapers or has features to direct a flow of urine or water towards said urinal back extension.

7. The toilet training device according to claim 1, wherein said rear of said base has a gap centrally located enabling said urinal back extension of said urinal attachment to extend therein to provide fluid communication with an insert interior when said removable waste reservoir is in place.

8. The toilet training device according to claim 1, wherein said toilet training device is cleaned by pouring a unit of liquid through an aperture shaped opening at said top of said urinal frame.

\* \* \* \* \*